Sept. 20, 1966       LE ROY R. BOGGS       3,273,414
MULTIPLE SPEED TRANSMISSION
Filed Dec. 17, 1963                         2 Sheets-Sheet 1

INVENTOR
Le Roy R. Boggs
BY
ATTORNEYS

| POSITION # | 5 | 4 | 3 | 2 | 1 | 12 | 11 | 10 | 9 | 8 | 7 | 6 |
|---|---|---|---|---|---|---|---|---|---|---|---|---|
| OUTPUT R.P.M. | 2048 | 4096 | 2 | 4 | 8 | 16 | 32 | 64 | 128 | 256 | 512 | 1024 |

INVENTOR
Le Roy R. Boggs
BY
ATTORNEYS

3,273,414
MULTIPLE SPEED TRANSMISSION
Le Roy R. Boggs, Bristol, Tenn., assignor to Universal Moulded Fiber Glass Corp., Bristol, Va., a corporation of Delaware
Filed Dec. 17, 1963, Ser. No. 331,270
5 Claims. (Cl. 74—353)

This invention relates to a multiple speed transmission and is particularly concerned with a novel gearing arrangement for the purpose of changing the transmission speed.

This application is a continuation-in-part of my copending application Serial No. 224,472, filed September 18, 1962.

It is an object of the invention to provide a variable speed transmission in which speed change may be effected through an exceptionally broad range of variation, and in which any of many different speed ratios may be selected.

It is a further object of the invention to provide mechanism for effecting reversal of the direction of drive, such mechanism being integrated into the transmission of the invention in a novel manner as will further appear.

The foregoing objects are accomplished according to the invention by mechanism including a unique arrangement of gearing which is not only simple in construction but also readily operated or adjusted to effect the desired speed change. How the foregoing and other objects and advantages are attained will be clear from the following description referring to the accompanying drawings illustrating the preferred embodiment of the invention and in which.

In the embodiment illustrated, the transmission mechanism of the invention is mounted in a transmission casing 5 having appropriate compartments and walls for housing and mounting the several gearing and driving elements employed.

The power input shaft for the mechanism is indicated at 6 and this shaft may be connected to any motor or power source desired, for instance to an electric motor through a speed reducer in the manner disclosed in my aforementioned copending application Serial No. 224,472. It may here also be noted that as disclosed in said copending application the transmission of the present invention is employed to effect variable speed drive of certain filament winding equipment used in making filament wound articles from resin impregnated fibrous reinforcements such as glass rovings.

Figure 1:
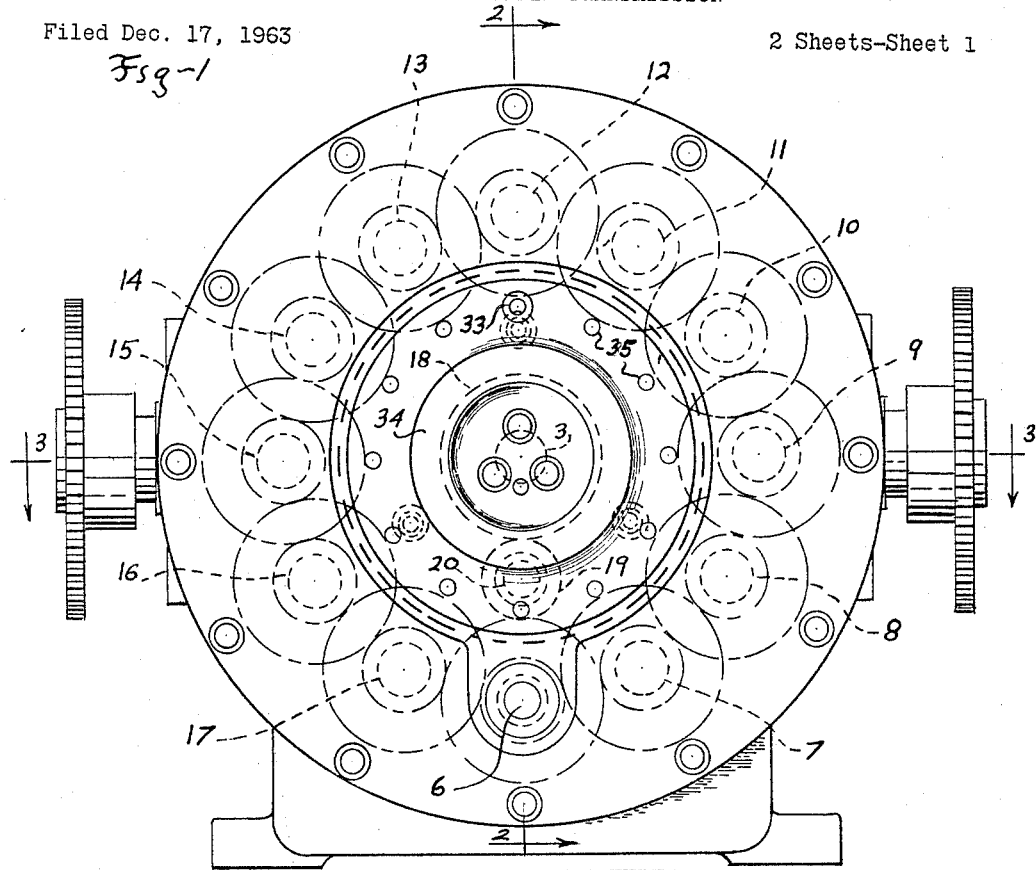
FIGURE 1 is an elevational view of a portion of a transmission mechanism according to the invention.
Figure 2:
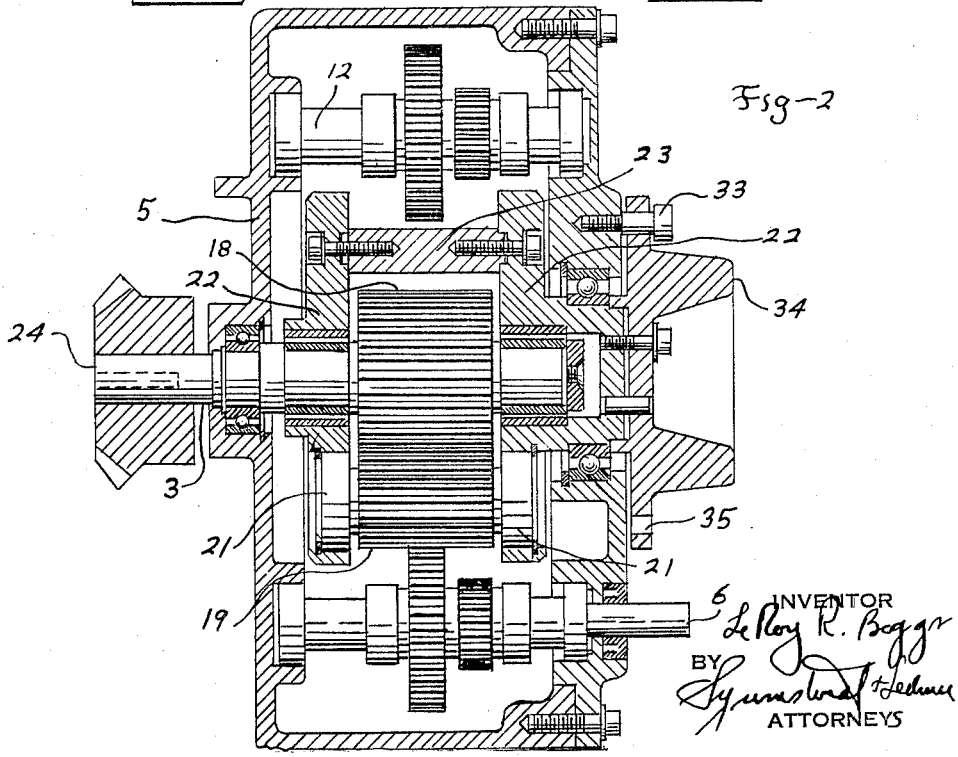
FIGURE 2 is a vertical sectional view taken as indicated by the line 2—2 on FIGURE 1.

From FIGURES 1 and 2 it will be seen that the input shaft 6 of the transmission is positioned in parallel spaced relation to the output shaft 3. A series of additional shafts 7 to 17 are similarly arranged in spaced parallel relation to the output shaft 3 and in a ring surrounding the output shaft, as appears in FIGURE 1, and each of the shafts 6 to 17 inclusive is provided with gears of different diameters. These gears and their arrangement appears to best advantage in FIGURE 4 which shows a developed view of the shafts and gears of the transmission unit, i.e., a representation of the shafts and gears as though they were laid out flat instead of mounted in a ring surrounding the output shaft 3.

Figure 3:
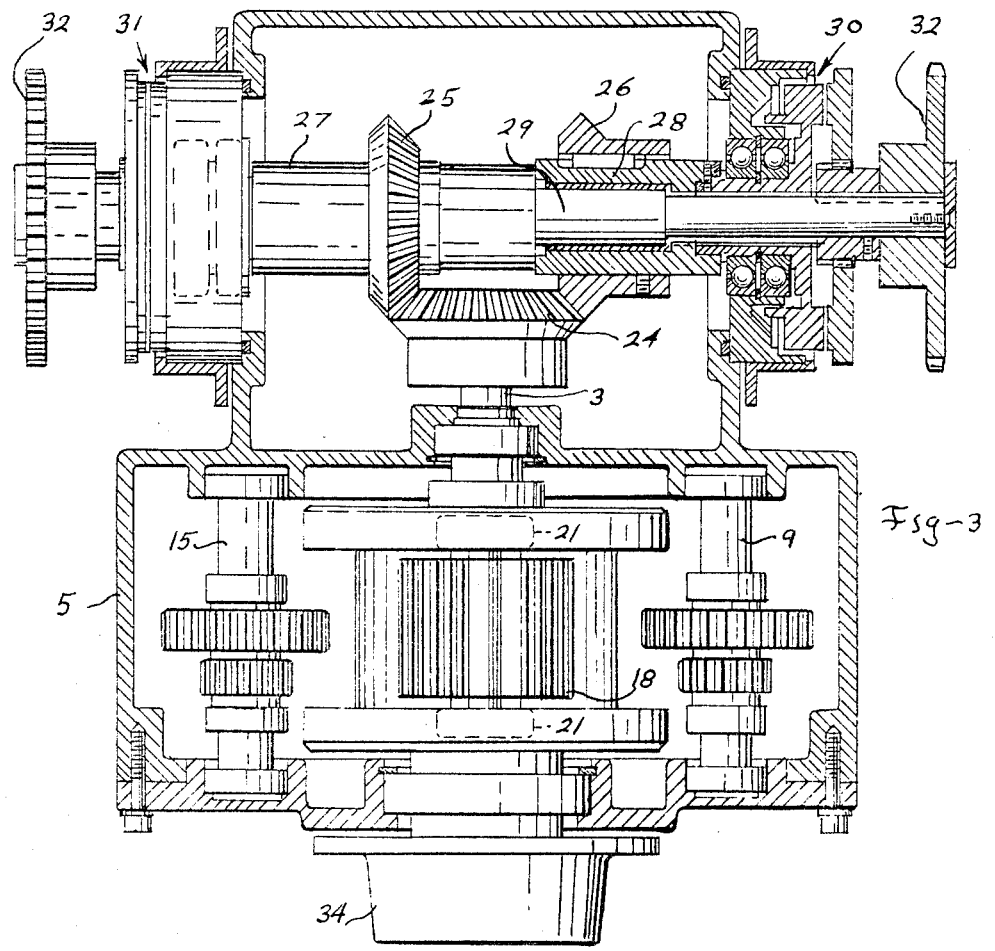
FIGURE 3 is a plan sectional view taken as indicated by the line 3—3 on FIGURE 1.
Figure 4:
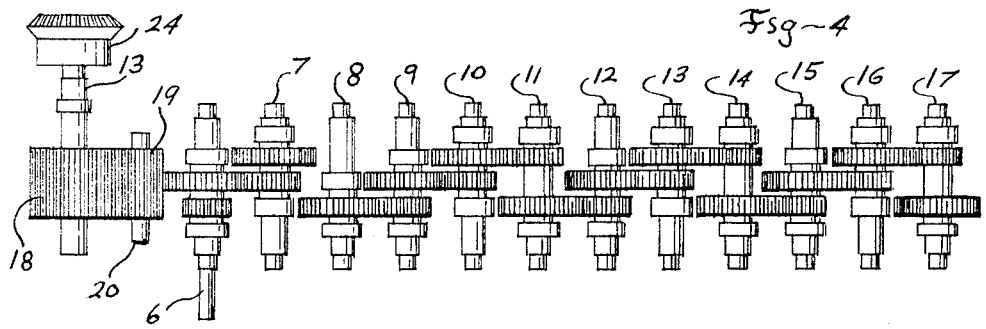
FIGURE 4 is a developed view of the change speed gear train included in the device shown in FIGURES 1, 2 and 3.

As clearly seen in FIGURES 2, 3 and 4, each of the shafts 6 to 17 is provided with two gears, one of which is of larger diameter than the other. The larger diameter gear on one shaft meshes with a smaller diameter gear of an adjacent shaft in the series. For example, referring to FIGURE 4, the larger diameter gear on shaft 8 meshes with the smaller diameter gear on shaft 9, the larger diameter gear on shaft 9 meshes with the smaller diameter gear on shaft 10 and so on to the end of the series shown at the right of FIGURE 4. With respect to shaft 17 which appears at the right of FIGURE 4, the larger diameter gear of that shaft meshes with the small diameter gear on shaft 6 which appears at the left end of the developed view of FIGURE 4, and the larger diameter gear on shaft 6 meshes with the small diameter gear on shaft 7. The large diameter gear on shaft 7 does not mesh with a small diameter gear on any other shaft of this series but is provided for a purpose to be expalined.

The output shaft 3 which is arranged at the center of the ring of shafts 6 to 17 carries a broad gear or pinion 18 meshing with a similar but smaller diameter gear 19 carried by a shaft 20, which shaft is journalled as at 21—21 (see FIGURE 2) in the discs 22—22 which are mounted for rotation on the central output shaft 3, the discs being interconnected by cross connections 23 providing a cage by means of which the gear 19 may be adjusted in position in the manner of a planet about the axis of the central or output shaft 3. The gear 19 may thus be positioned to intermesh with any one of the larger diameter gears provided on shafts 6 to 17 and with the central gear 18 provided on the output shaft 3. In this way power may be delivered from any one of shafts 6 to 17 to the gear 18, thus transmitting power to the output shaft 3 and through the gear 24 also mounted on shaft 3 to one or the other of gears 25 and 26 which are connected with sleeves 27 and 28. Sleeves 27 and 28 are rotatively mounted on shaft 29 and the sleeves may alternatively be connected with shaft 29 by means of dog clutch devices 30 and 31. In this way a reversal of direction of drive may be effected between the output shaft 3 of the change speed mechanism and power delivery shaft 29. Shaft 29 may be provided with sprockets 32 or with other means for delivery of power to a point of use.

The cage 22—22, 23 for mounting the planet gear 19 may be adjusted to any desired position (see FIGURE 2) by removing the fastening bolt 33 and turning the projecting handle or knob 34 to bring another one of the apertures 35 provided in the knob flange into alignment with the aperture in the casing with which the bolt 33 cooperates. The flange of the knob 34 is provided with a series of apertures 35, one corresponding to each of 12 positions of adjustment which provide for engagement of the planet gear 19 with the larger diameter gear on each one of the shafts 6 to 17.

This gear selection mechanism makes possible wide variation of speed reduction. Specifically, with smaller and larger gears on the shafts 6 to 17 providing a 2:1 ratio, the adjustments provide for variation of the speed reduction in steps as follows:

First, for purposes of identification, the several selection positions are marked below FIGURE 4 as positions numbers 1 to 12.

Assuming an input r.p.m. at the input shaft 6 of 2,048 r.p.m., then with the selector gear 19 in position number 5, i.e., in engagement with the large gear of the input shaft 6, the output r.p.m., i.e., the r.p.m. of shaft 3, will be the same as the input r.p.m., namely 2,048. This is a 1:1 ratio between the input and output.

Next consider the selector gear 19 at position number 4. In this instance the gearing between the input shaft and the shaft 7 at position number 4 is a step-up rather than a step-down. Therefore with the input shaft r.p.m. at 2,048, the r.p.m. of the output shaft 3 will be 4,096.

All of the other selection positions provide step-down in speed from the input to the output. For example, at selection position number 6 in which the selector gear 19 engages the large gear on shaft 17, for the input r.p.m. of 2,048, the output r.p.m. will be 1,024. With regard to this particular station as illustrated at the right hand end of FIGURE 4 it will be understood that the large diameter gear on shaft 17 is in constant mesh with the small diameter gear on the input shaft 6.

As another example, consider the selector gear 19 at position number 7. Here there is another 2:1 reduction so that for an input r.p.m. of 2,048, the output r.p.m. will be 512. Similarly, still further 2:1 reductions occur if the selector gear is moved to positions 8, 9, 10, 11, 12, 1, 2 and 3, until at position number 3 the output r.p.m. will be 2 for an input r.p.m. of 2,048, or an input to output ratio of 1,024 to 1.

It may be observed that the large diameter gear on shaft 7 does not mesh with a small diameter gear on its neighboring shafts at either side. This gear, however, is provided for engagement with the selector gear when it is moved to position number 4.

Attention is now directed to the fact that when the selector gear 19 is shifted from one position to an adjacent position, the direction of rotation of the output shaft 3 will be reversed for a given direction of the input shaft 6. With any such adjustment however the clutches 30–31 in the reversing mechanism may be used to provide either direction of rotation transmitted to the power delivering shaft 29. The capability of reversing the direction of rotation of the shaft 29 (by means of alternative or alternating use of the clutches 30 and 31) is a feature of importance when it is desired to effect speed change and still maintain a given direction of rotation of the power delivery shaft.

According to the foregoing, provision is made for wide variation in input to output speed and this is accomplished by the use of simple gearing arrangements which may readily be adjusted to any of the many speed variations provided for.

I claim:

1. A drive transmission including an output shaft, a series of gear shafts one of which comprises an input shaft, the shafts of said series being parallel to said output shaft and to each other and arranged around the output shaft at equal distances therefrom, each of said gear shafts having two gears thereon of different diameters with the larger gear on each shaft meshing with the smaller gear on an adjacent shaft of the series, a gear on the output shaft, and a gear shiftable in an orbit around the output shaft for selectively interconnecting the gear on the output shaft with the larger gear on any of said gear shafts.

2. A drive transmission including an output shaft, a series of gear shafts one of which comprises an input shift, the shafts of said series being parallel to said output shaft and to each other and arranged around the output shaft at equal distances therefrom, each of said gear shafts having two gears thereon of different diameters with the larger gear on each shaft meshing with the smaller gear on an adjacent shaft of the series, a gear on with the larger gear on each shaft, meshing with the output shaft for selectively interconnecting the gear on the output shaft with the larger gear on any of said gear shafts, in which construction with a given direction of drive of the input shaft, the output shaft will rotate in opposite directions upon shift of the shiftable gear from the larger gear on one shaft to the larger gear on an adjoining shaft, and transmission parts associated with said output shaft including a driven shaft, a pair of intermediate drive elements driven in opposite directions by said output shaft, and a pair of clutches alternatively engageable to connect either of said drive elements with said driven shaft.

3. A drive transmission including a series of gear shafts arranged in a circular series with the axes thereof parallel to each other and to the axis of said series, an input shaft and an output shaft one of which is disposed with its axis coincident with the axis of said circular series of shafts and the other of which is geared to one of the said gear shafts, each of said gear shafts having two gears thereon of different diameters with the larger gear on each shaft meshing with the smaller gear on an adjacent shaft, a center gear on the shaft having its axis coincident with the axis of the series of gear shafts, and a gear shiftable in an orbit around the axis of said series for selectively interconnecting the larger gear on any of said gear shafts with said center gear.

4. A drive transmission according to claim 3 in which one of said input and output shafts is intergeared with said gear shafts in a position intermediate the ends of the series thereof, thereby providing alternatively for step-up and step-down between the input and output shafts.

5. A drive transmission including a series of gear shafts arranged in a circular series with the axes thereof parallel to each other and to the axis of said series, an input shaft and an output shaft one of which is disposed with its axis coincident with the axis of said circular series of shafts and the other of which is geared to one of the said gear shafts, gears of different sizes sequentially interconnecting said series of shafts to provide for rotation thereof at different rates, at least a plurality of said gear shafts having gears thereon of the same diameter, a center gear on the shaft having its axis coincident with the axis of the series of gear shafts, and an idler gear shiftable in an orbit around the axis of said series for selectively interconnecting said center gear with any of said plurality of gears of the same diameter.

References Cited by the Examiner

UNITED STATES PATENTS

| | | | |
|---|---|---|---|
| 1,981,428 | 11/1934 | Schneider | 74—353 |
| 2,775,904 | 1/1957 | Edwards | 74—353 |
| 3,113,468 | 12/1963 | Humphrey | 74—353 |

FOREIGN PATENTS 596,708  1/1948  Great Britain.

DAVID J. WILLIAMOWSKY, *Primary Examiner.*

H. S. LAYTON, *Assistant Examiner.*

UNITED STATES PATENT OFFICE
CERTIFICATE OF CORRECTION

Patent No. 3,273,414                                   September 20, 1966

Le Roy R. Boggs

It is hereby certified that error appears in the above numbered patent requiring correction and that the said Letters Patent should read as corrected below.

Column 3, line 59, for "shift" read -- shaft --; column 4, lines 1 to 5, for "a gear on with the larger gear on each shaft, meshing with the output shaft for selectively interconnecting the gear on the output shaft with the larger gear on any of said gear shafts," read -- a gear on the output shaft, a gear shiftable in an orbit around the output shaft for selectively interconnecting the gear on the output shaft with the larger gear on any of said gear shafts, --.

Signed and sealed this 29th day of August 1967.

(SEAL)
Attest:

ERNEST W. SWIDER                              EDWARD J. BRENNER
Attesting Officer                            Commissioner of Patents